Patented Apr. 28, 1925.

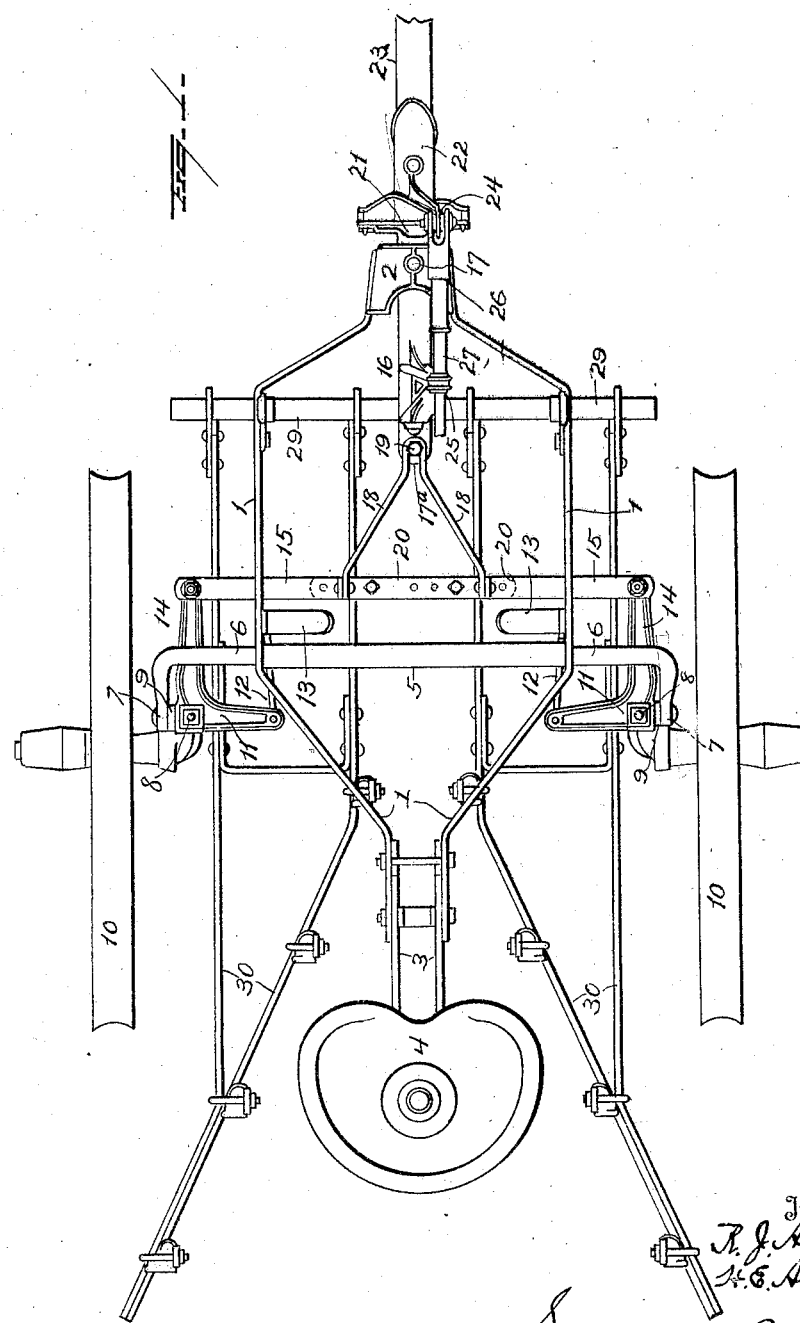

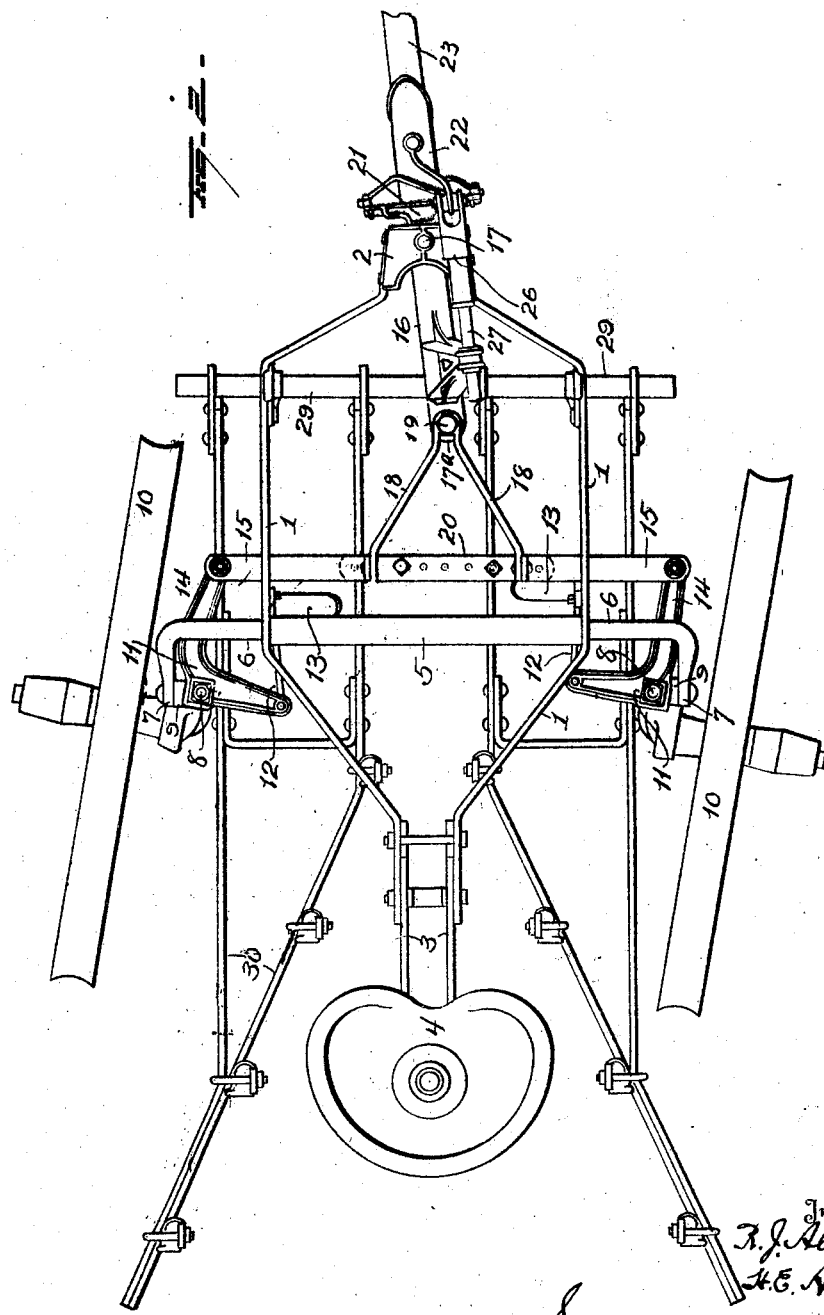

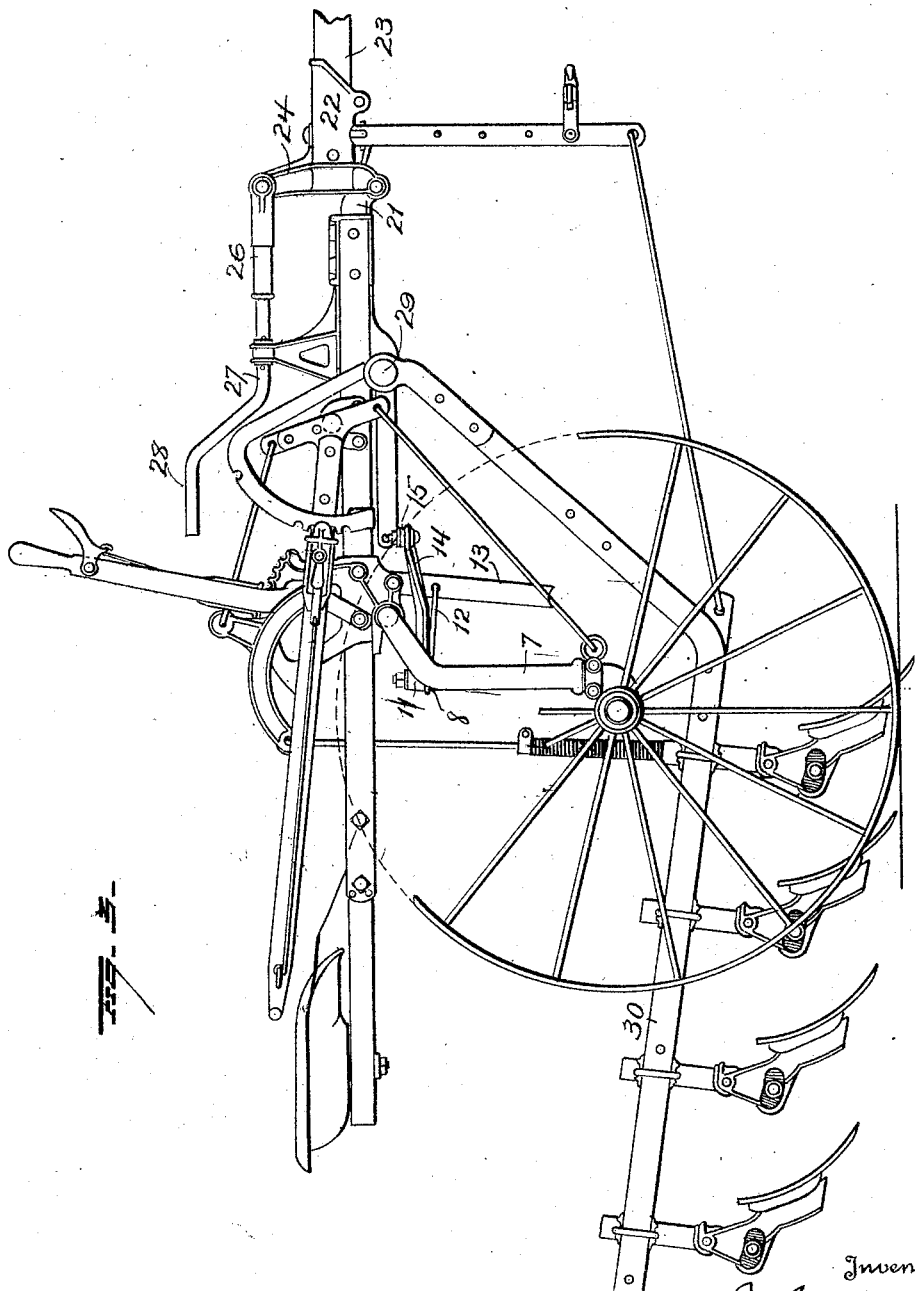

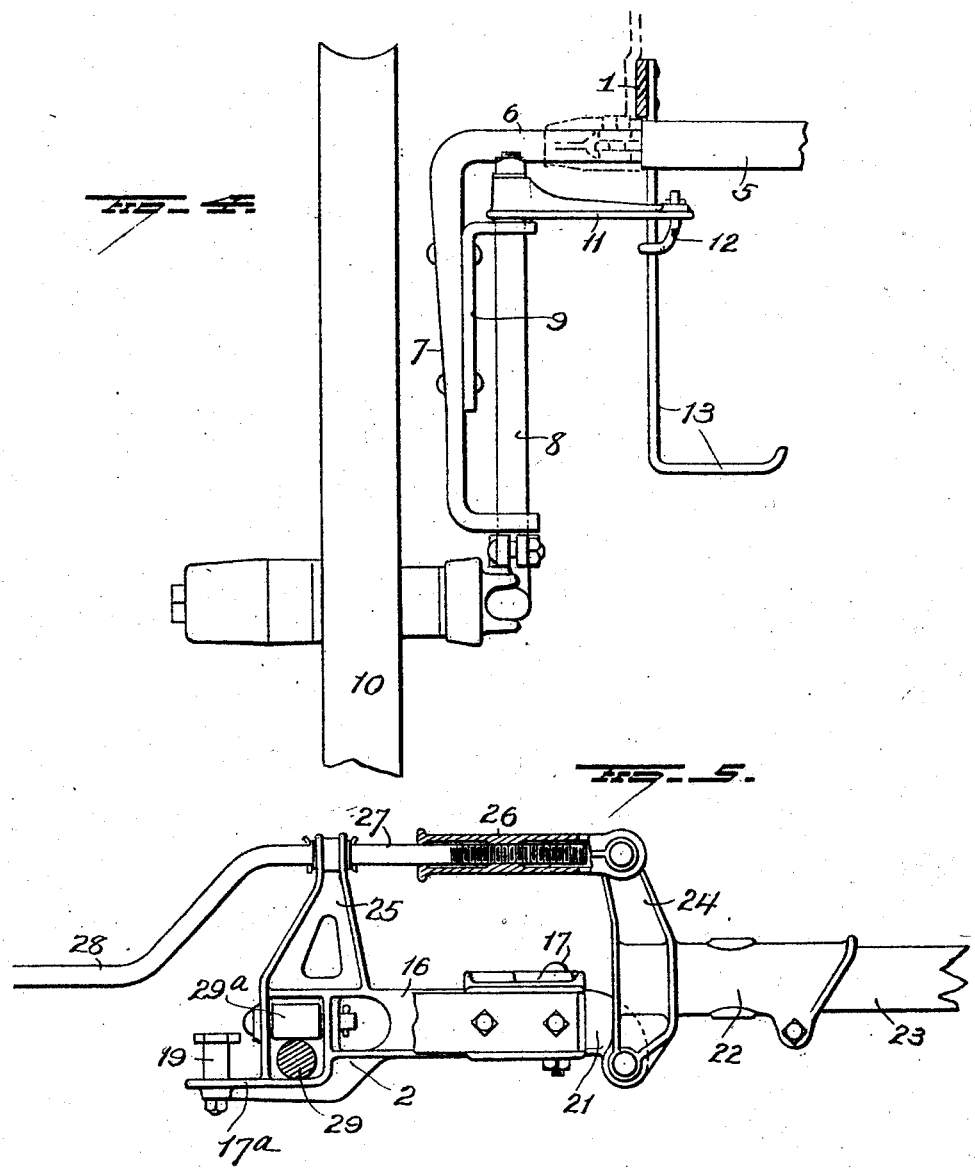

1,535,888

UNITED STATES PATENT OFFICE.

RUDOLPH J. ALTGELT AND HERMAN E. ALTGELT, OF SOUTH BEND, INDIANA, ASSIGNORS TO OLIVER CHILLED PLOW WORKS, OF SOUTH BEND, INDIANA.

WHEELED CULTIVATOR.

Application filed August 8, 1922. Serial No. 580,452.

*To all whom it may concern:*

Be it known that we, RUDOLPH J. ALTGELT and HERMAN E. ALTGELT, citizens of the United States, and residents of South Bend, in the county of Saint Joseph and State of Indiana, have invented certain new and useful Improvements in Wheeled Cultivators; and we do hereby declare the following to be a full, clear, and exact description of the invention, such as will enable others skilled in the art to which it appertains to make and use the same.

This invention relates to improvements in wheeled cultivators and more particularly to such as embody pivot-axle and pivot-pole constructions—one object of the invention being to provide simple and efficient means for effecting pivotal movements of the axle members on which the carrying wheels are located and simultaneous lateral pivotal movement of the pole, whereby, when the wheel axle members pivot in one direction, the pole will swing laterally in the reverse direction.

A further object is to obtain in a cultivator of the type specified a maximum amount of side-wise movement, with the use of foot levers, both for hill-side work and crooked rows.

With these and other objects in view, the invention consists in certain novel features of construction and combinations of parts as hereinafter set forth and pointed out in the claims.

In the accompanying drawings, Figures 1 and 2 are plan views of a cultivator illustrating an embodiment of our invention; Figure 3 is a side elevation; Figure 4 is a detail view illustrating the mountings of one of the pivot axle members, and Figure 5 is an enlarged detail view showing the pole mountings.

The main frame of the cultivator is indicated at 1 and the forward portions of the side bars of said frame approach each other and support a hollow casting 2 in line with the longitudinal axis of the cultivator. The rear portions of the side bars of the main frame approach each other and have connected therewith supporting bars 3 for a seat 4.

A tubular bar 5 is secured to the main frame so as to be disposed transversely of the same and provides a mounting for a main crank axle 6. The lower end of the crank arm 7 at each end of the axle is bent inwardly and forms one bearing for the vertical portion of a pivot axle 8, the other bearing for the latter being provided by means of a bracket 9 secured to the crank arm 7 of the main axle. The lower ends of the respective pivot axles are projected laterally to form spindles which enter the hubs of carrying wheels 10.

To the upper end of the respective pivot axles 8, bell-crank levers 11 are secured and with the shorter inwardly projecting arms of these bell-crank levers, the rear ends of rods 12 are connected, the forward ends of said rods being attached to foot levers 13 suspended from the frame of the cultivator. the longer forwardly projecting arms 14 of the bell-cranks are connected by a cross-bar 15, the latter comprising two members adjustably connected together whereby the carrying wheels may be adjusted to proper positions so that they will always bear a proper relation to the frame of the cultivator and to each other.

A stub pole 16 has its forward portion pivotally mounted in the bracket casting 2 by means of a vertical pivot bolt 17 and to the rear end of a bracket 17$^a$ on said stub pole the forward end of a V-shape bracket 18 is connected by a pin or bolt 19. The rear end of the bracket 18 is connected with a bearing plate 20 secured centrally upon the cross-bar 15.

The forward end of the stub pole is provided with an arm or bracket 21 with which the lower end portion of a socketed main pole bracket 22 is pivoted,—said bracket receiving the main pole 23. The bracket 22 is provided with an upwardly projecting arm 24 and the stub pole is provided with an upwardly projecting arm 25. An internally threaded member 26 is pivoted to the arm 24 of the pole bracket and receives the threaded portion of a screw rod 27 mounted in the upwardly projecting arm 25,—said screw rod or shaft being provided with a crank handle 28 or other means whereby it may be manually operated.

The main frame 1 carries at its forward portion a transverse shaft 29 with which the forward portions of cultivator gangs 30 are connected and said shaft also serves as a trackway or bearing for a roller 29$^a$ carried by the stub pole bracket 17$^a$.

The gangs may be raised and lowered by means of mechanism as disclosed in co-pending application Serial No. 580,453.

We do not claim in this application the screw adjusting devices between the pole and stub pole described, the same being covered in our co-pending application Serial No. 580,451.

With the use of our improvements, the operator may, through the medium of the foot levers, keep the carrying wheels in proper positions or to move them with the pivot axles in a manner to cause the cultivator to properly travel along crooked rows. When the parts are in the positions shown in Figure 1, with the carrying wheels parallel with the cultivator frame and parallel with each other, and the operator moves the foot levers in a manner to cause the turning of the pivot axles to dispose the carrying wheels in the positions shown in Figure 2, motion will at the same time be transmitted by the bell-cranks to the cross-bar 15 and the movement of the latter will, through the medium of the V-shape bracket 18 cause the stub pole 16 to turn on the vertical pivot bolt 17 and thus shift the pole laterally in a direction opposite to that in which the carrying wheels were shifted. Thus it will be seen that the carrying wheels may be shifted with the pivot axles in one direction and that the pole will be simultaneously shifted in the reverse direction, and it will also be observed that with the use of our improvements, a maximum amount of side-wise movement may be effected with the use of the foot levers, both for hillside work and crooked rows.

Having fully described our invention what we claim as new and desire to secure by Letters-Patent, is:

1. In a cultivator, the combination with a frame, cultivator gangs, pivot axles and carrying wheels, of a pole structure having connection with the frame by a vertical pivot, bell-cranks secured to said pivot axles, means connecting arms of said bell-cranks, means connecting said connecting means with the pivoted pole structure, and foot levers connected with other arms of said bell-cranks.

2. In a cultivator, the combination with a frame, cultivator gangs, pivot axles and carrying wheels, of a pole structure connected with said frame by a vertical pivot, bell-cranks secured to said pivot axles, an adjustable cross-bar connecting the forward arms of said bell-cranks, foot levers suspended from the frame and connected with the other arms of said bell-cranks, a bracket attached to said cross-bar, and a pivotal connection between said bracket and the rear portion of the pole structure.

3. In a cultivator, the combination with a frame, pivot axles, carrying wheels and a shaft at the forward portion of said frame, of cultivator gangs connected with said shaft, a stub pole connected with the forward portion of the frame by a vertical pivot and movably supported on said shaft, means for connecting a main pole with said stub pole, bell-cranks secured to the pivot axles, means connecting the forwardly projecting arms of said bell-cranks, a connection between said connecting means and the rear portion of the stub pole, foot levers suspended from the frame, and means for connecting said foot levers with the other arms of the bell-cranks.

In testimony whereof, we have signed this specification in the presence of two subscribing witnesses.

RUDOLPH J. ALTGELT.
HERMAN E. ALTGELT.

Witnesses:
JENNIE M. DAVIS,
HELEN GOSS.